United States Patent [19]
Nishino et al.

[11] Patent Number: 5,763,034
[45] Date of Patent: Jun. 9, 1998

[54] FUEL TRANSFER TUBE

[75] Inventors: Todomu Nishino; Minoru Hirota; Yuji Nakabayashi; Akashi Nakatsu, all of Nabari, Japan

[73] Assignee: Nitta Moore Company, Osaka, Japan

[21] Appl. No.: 603,856

[22] Filed: Feb. 22, 1996

Related U.S. Application Data

[63] Continuation of Ser. No. 27,066, Mar. 5, 1993, abandoned.

[30] Foreign Application Priority Data

Mar. 5, 1992 [JP] Japan ................... 4-048430
Mar. 5, 1992 [JP] Japan ................... 4-048431

[51] Int. Cl.$^6$ ........................................ B29D 22/00
[52] U.S. Cl. ............... 428/36.91; 428/36.9; 428/36.6; 428/35.7; 138/137
[58] Field of Search ..................... 127/36.6, 35.7, 127/36.9, 36.91, 36.92, 421, 422, 464, 76.3, 520; 138/137

[56] References Cited

U.S. PATENT DOCUMENTS

| | | | |
|---|---|---|---|
| Re. 322,230 | 8/1986 | Satoh et al. ................... | 138/126 |
| 4,758,455 | 7/1988 | Campbell et al. ............. | 428/36 |
| 4,887,647 | 12/1989 | Igarashi et al. ................ | 138/126 |
| 5,038,833 | 8/1991 | Brunnhofer .................... | 138/125 |
| 5,096,782 | 3/1992 | Dehannau et al. ............. | 428/412 |
| 5,194,306 | 3/1993 | Blatz ............................... | 428/354 |

*Primary Examiner*—James J. Seidleck
*Assistant Examiner*—Michael A. Williamson
*Attorney, Agent, or Firm*—Morrison Law Firm

[57] ABSTRACT

A fuel transfer tube comprises an inner layer of hot-melt fluororesin and an outer layer of partial aromatic polyamide resin or ethylene-vinyl alcohol copolymer. The layer of hot-melt fluororesin reliably prevents alcohol from permeating into the tube, while gasoline is effectively prevented from permeating into the tube by the layer of partial aromatic polyamide resin or ethylene-vinyl alcohol copolymer. The fuel transfer tube, therefore, is suitable for transferring alcohol, gasoline and a mixture thereof.

54 Claims, 4 Drawing Sheets

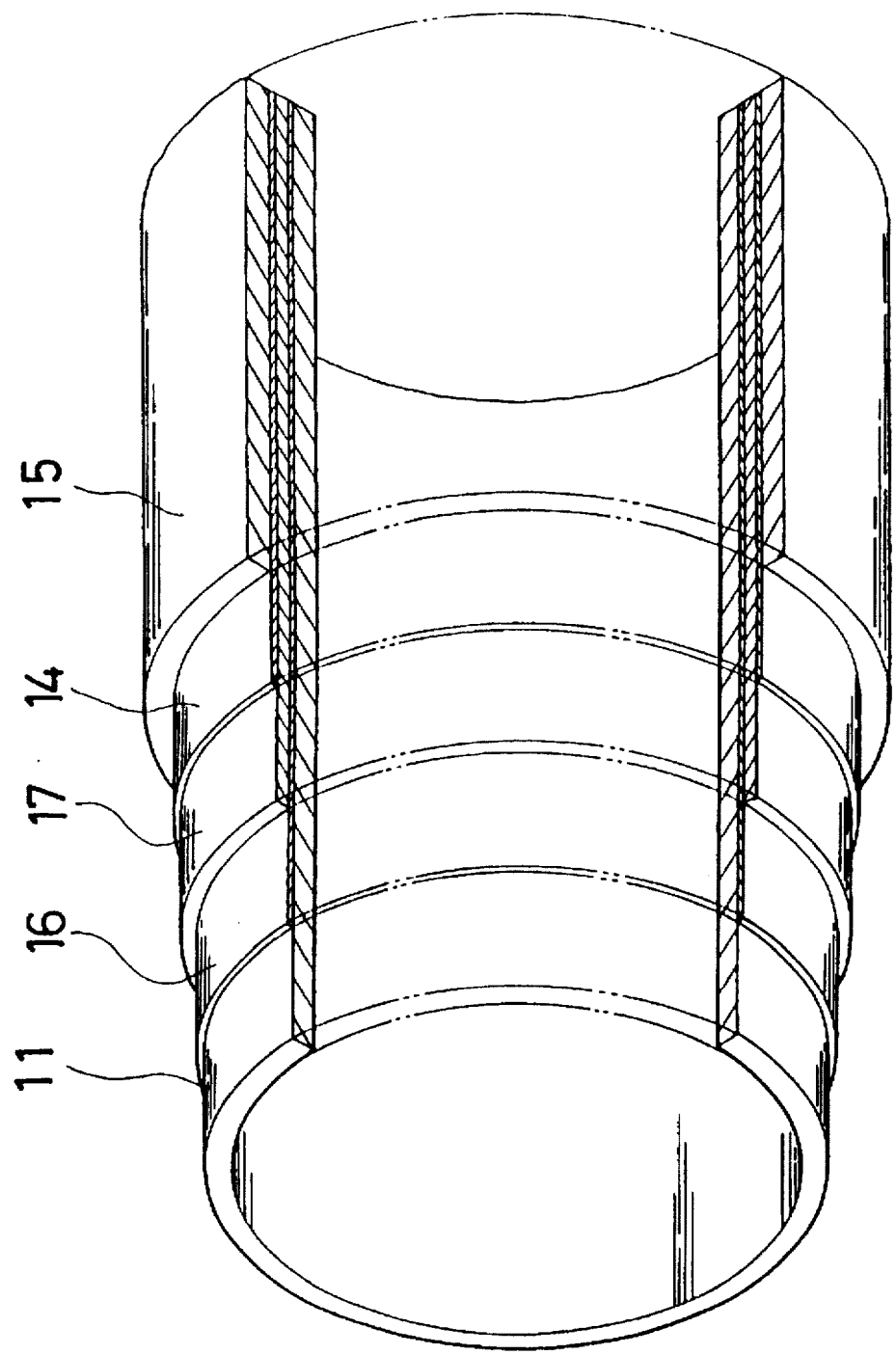

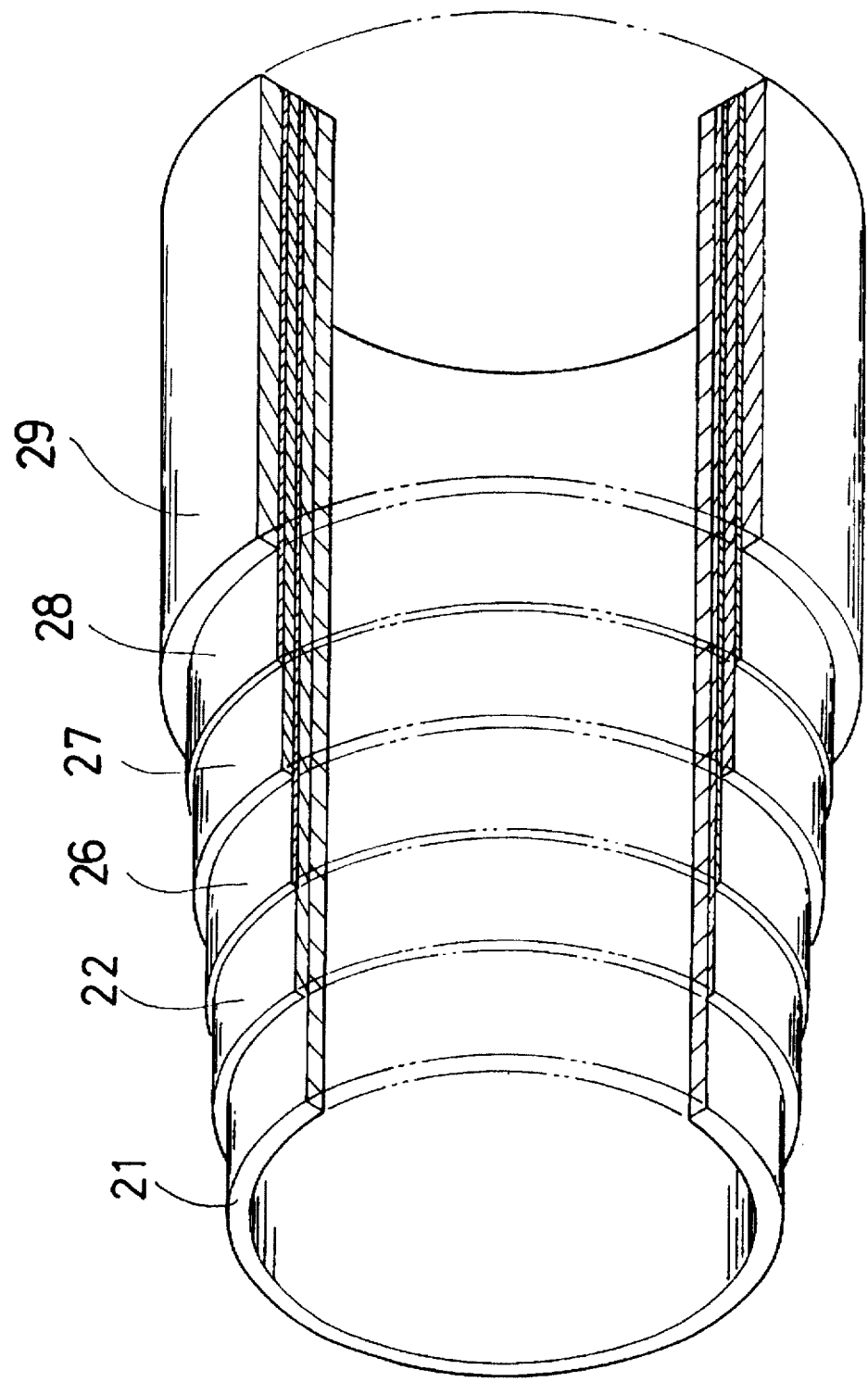

FUEL TRANSFER TUBE

This application is a continuation of application Ser. No. 08/027,066 filed Mar. 5, 1993, now abandoned.

BACKGROUND OF THE INVENTION

1. Field of the Invention

The present invention relates to a tube for transferring an alcohol mixed fuel (hereinafter referred to as a fuel transfer tube).

2. Prior Art

Various kinds of fuel transfer tubes have already been proposed, such as a tube made of metal, a tube made of Nylon 11 or 12, a tube having an innermost layer made of Nylon 6, 12, polyolefin, or ethylene-vinyl alcohol copolymer, and so forth.

Permeability tests (1) of alcohol and gasoline and flexibility evaluation tests (2) were conducted using some of the above known tubes. The tubes used in the tests measured 8 mm in outside diameter and 6 mm in inside diameter. The criterion (3) of the permeability test and the flexibility evaluation test is shown below and the results of the tests are also shown below in Table 1.

3. Test Methods (1) Permeability test

A strip of 1,000 mm of the tube (outside diameter 8 mm, inside diameter 6 mm) was filled with each sample liquid, and left to stand in a 60° C. oven, and the weight loss thereof was measured at specific time intervals.

The permeability is determined by the weight loss per 1000 m of the tube per day (rate of permeation : g/m/day).

| (Sample liquids) | |
|---|---|
| 1. Regular gasoline: | Gasoline available at an ordinary gas station. |
| 2. Fuel C: | A mixture of reagent class toluene and reagent class iso octane at 1:1 by volume. |
| 3. Methanol: | Reagent class methanol as is. |
| 4. FAM15: | A mixture of the Fuel C and methanol by 85:15 by volume. |

(2) Flexibility evaluation tests

The end of a 400 mm-long strip of the tube being held, the load required for bending 180 degrees around the surface of a semicircular disc of 100 mm in radius was measured, by which the flexibility of the tube was determined.

(3) Criterion (outside diameter 8 mm, inside diameter

| Permeability (rate of permeation) | |
|---|---|
| 1. Regular gasoline: | 0.005 g/m/day or less |
| 2. Fuel C: | 0.005 g/m/day or less |
| 3. Methanol: | 0.2 g/m/day or less |
| 4. FAM15: | 0.2 g/m/day or less |
| Flexibility | |
| 1.0 kgf or less | |

4. Test Results

TABLE 1

Comparative Examples

| | Layer composition (inside → outside) | | | | | Permeability φ 8 × φ 6 (g/m/day) | | | | |
|---|---|---|---|---|---|---|---|---|---|---|
| Examples | Inner layer | Adhesive Layer | Middle Layer | Adhesive Layer | Outer Layer | Regular Gasoline | Fuel C | Methanol | FAM15 | Flexibility (kgf) |
| 1 | Nylon 11 without plasticizer | | | | | 0.006 | 0.03 | 3.4 | 1.3 | 1.3 |
| 2 | Nylon 12 without plasticizer | | | | | 0.03 | 0.08 | 6.8 | 1.8 | 1.3 |
| 3 | Nylon 11 with plasticizer (about 14%) | | | | | 0.11 | 0.18 | 3.3 | 2.9 | 0.5 |
| 4 | Nylon 12 with plasticizer (about 14%) | | | | | 0.30 | 0.56 | 8.1 | 3.2 | 0.5 |
| 5 | Polyvinylidene fluoride resin (PVDF) | | | | | 0.0005 | 0.005 | 0.13 | 0.11 | 1.8 |
| 6 | Ethylene-ethylene tetrafuoride copolymer (ETFE) | | | | | 0.01 | 0.01 | 0.03 | 0.02 | 1.1 |
| 7 | Nylon 6 (Thickness: 0.2 mm) | Ethylene-vinyl Alcohol Copolymer (EVOH) (0.1) | Nylon 6 (0.3) | Denatured polyolefin (0.1) | Nylon 12 (0.3) | 0.0009 | 0.0007 | 1.42 | 0.8 | 0.8 |
| 8 | Denatured polyolefin (Thickness: 0.2 mm) | Nylon 12 (0.8) | | | | 0.35 | 0.65 | 1.05 | 3.0 | 0.6 |
| 9 | Nylon 12 (Thickness: 0.1 mm) | Denatured polyolefin (0.05) | EVOH (0.1) | Denatured polyolefin (0.05 | Nylon 12 (0.5) | 0.0012 | 0.001 | 1.0 | 2.9 | 0.6 |
| 10 | EVOH (Thickness: 0.2 mm) | Denatured polyolefin (0.1) | Nylon 12 (0.1) | | | 0.001 | 0.0008 | 2.0 | 3.1 | 0.7 |
| 11 | Partial aromatic polyamide resin | | | | | 0.0001 | 0.0001 | 2.9 | 1.2 | 5.5 |
| 12 | EVOH | | | | | 0.0005 | 0.0004 | 5.6 | 3.3 | 2.0 |

Comparing the test results shown in Table 1 with the criterion (3), it is found that none of the comparative examples was satisfactory in gasoline permeability, alcohol permeability and flexibility.

OBJECT SUMMARY OF THE INVENTION

It is hence a primary object of the present invention to provide a tube which is especially sufficient in the above gasoline and alcohol permeability, that is, a fuel transfer tube suitable for transferring alcohol, gasoline, and a mixture thereof.

The fuel transfer tube of the present invention comprises an inner layer of hot-melt fluororesin, and an outer layer of partial aromatic polyamide resin or ethylene-vinyl alcohol copolymer.

In the fuel transfer tube of the present invention, the layer of hot-melt fluororesin reliably prevents alcohol from permeating into the tube, while gasoline is effectively prevented from permeating into the tube by the layer of partial aromatic polyamide resin or ethylene-vinyl alcohol copolymer.

BRIEF DESCRIPTION OF THE DRAWINGS

FIG. 3 is a sectional perspective view of Embodiment 3 of a fuel transfer tube of the invention.

FIG. 4 is a sectional perspective view of Embodiment 4 of a fuel transfer tube of the invention.

DETAILED DESCRIPTION OF THE PREFERRED EMBODIMENTS

Referring now to the accompanying drawings, some embodiments of the present invention are described below.

Embodiment 1

Figure 1:
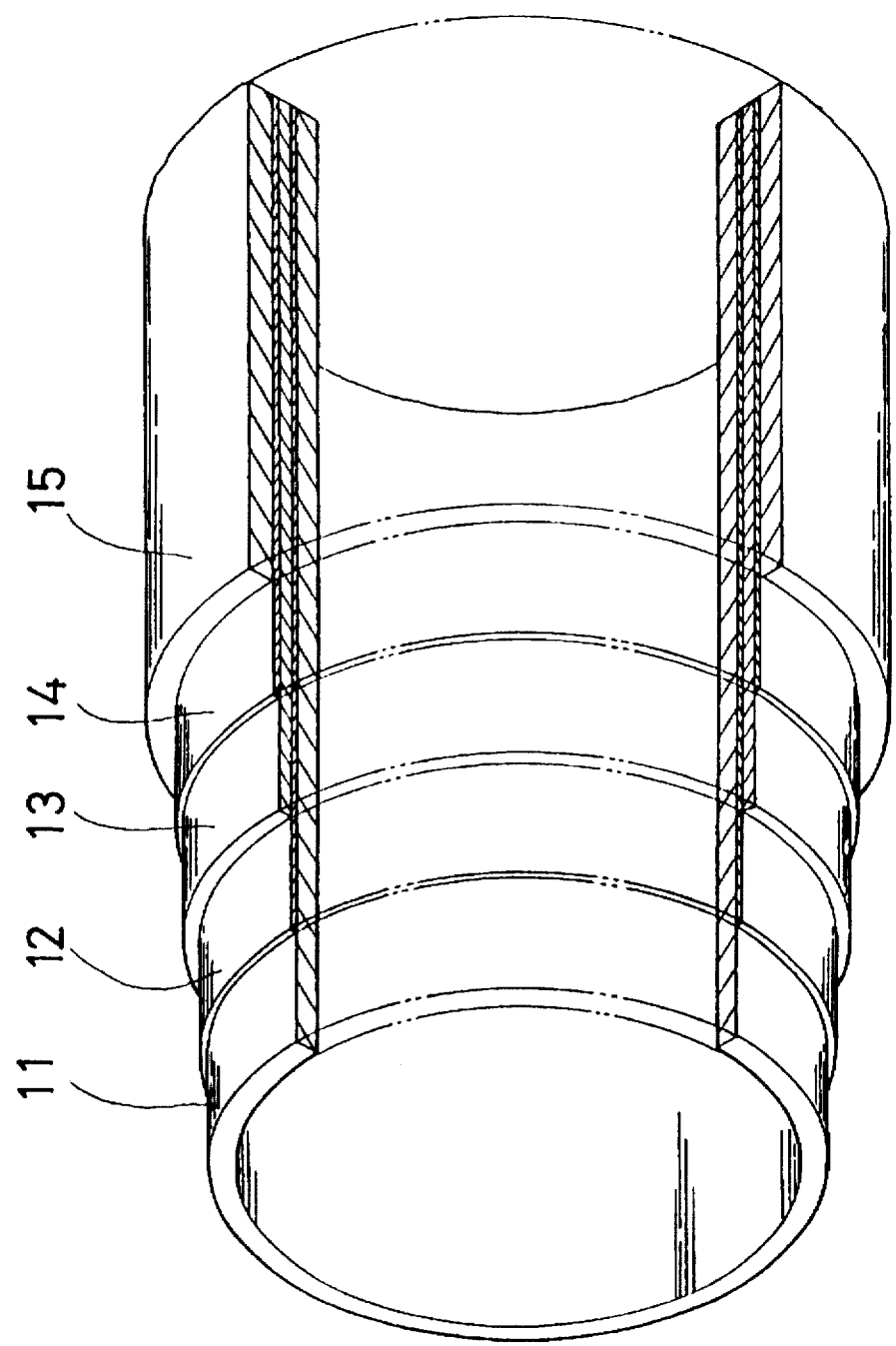
FIG. 1 is a sectional perspective view of Embodiment 1 of a fuel transfer tube of the present invention.

The tube of Embodiment 1 is composed of five layers as shown in FIG. 1 and is 8 mm in outside diameter and 6 mm in inside diameter. The tube is formed by laminating a polyvinylidene fluoride PVDF layer 11, an ethylene-vinyl acetate-glycidyl methacrylate copolymer layer 12, a partial aromatic polyamide MXD6 layer 13, a denatured polyolefin layer 14, and a plasticized Nylon 11 layer 15 in sequence from inside to outside. The layers 11, 12, 13, 14, and 15 are respectively 0.2 mm, 0.05 mm, 0.1 mm, 0.05 mm and 0.6 mm in thickness.

Embodiment 2

Figure 2:
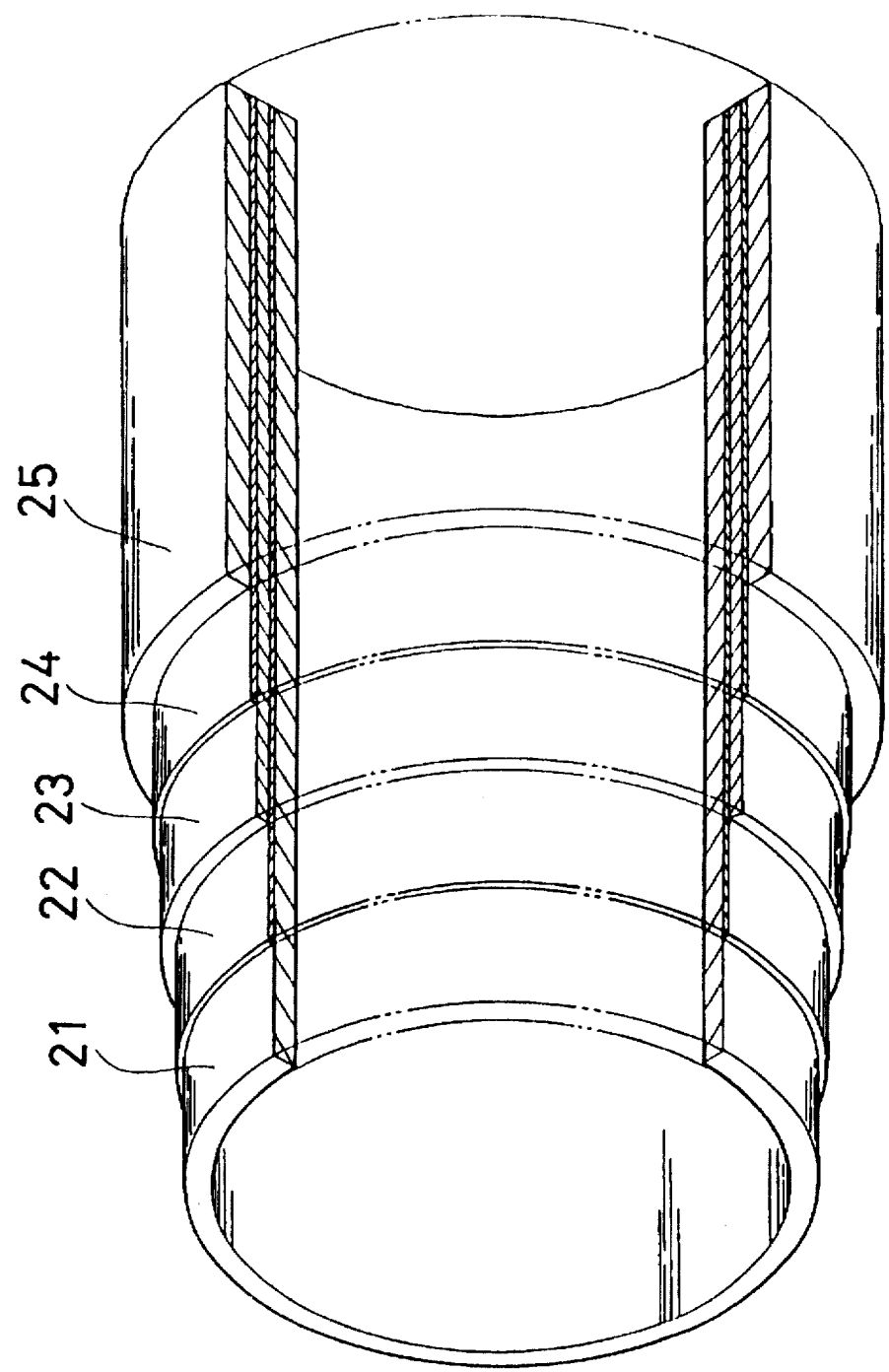
FIG. 2 is a sectional perspective view of Embodiment 2 of a fuel transfer tube of the invention.

The tube of Embodiment 2 is composed of five layers as shown in FIG. 2, and is also 8 mm in outside diameter and 6 mm in inside diameter. The tube is formed by laminating an ethylene-ethylene tetrafluoride copolymer ETFE layer 21, an ethylene-methyl acrylate-glycidyl methacrylate copolymer layer 22, a partial aromatic polyamide MXD6 layer 23, an acid denatured polystyrene-ethylene butadiene copolymer layer 24, and a polyester elastomer layer 25 in order from inside to outside. The layers 21, 22, 23, 24, and 25 are respectively 0.33 mm, 0.05 mm, 0.1 mm, 0.05 mm, and 0.5 mm in thickness.

Embodiment 3

The tube of Embodiment 3 is composed similarly to Embodiment 2. Instead the ethylene-methyl acrylate-glycidyl methacrylate copolymer layer 22 in Embodiment 2, however, an epoxy adhesive layer is provided. And the outer surface of the ethylene-ethylene tetrafluoride copolymer ETFE layer 21 is treated to enhance the wettability and adhesion of the epoxy adhesive.

Embodiment 4

The tube of Embodiment 4 comprises five layers as shown in FIG. 3, and measures 8 mm in outside diameter and 6 mm in inside diameter. The tube is formed by laminating a polyvinylidene fluoride PVDF layer 11, an acid denatured ethylene-ethyl acrylate copolymer layer 16, an ethylene-vinyl alcohol copolymer layer 17, a denatured polyolefin layer 14, and a plasticized Nylon 11 layer 15 in sequence from inside to outside. The layers 11, 16, 17, 14, and 15 are respectively 0.2 mm, 0.05 mm, 0.1 mm, 0.05 mm, and 0.6 mm in thickness.

Embodiment 5

The tube of Embodiment 5 comprises six layers as shown in FIG. 4, and the outside diameter, and the inside diameter thereof are still 8 mm and 6 mm respectively. The tube is formed by laminating an ethylene-ethylene tetrafluoride copolymer ETFE layer 21, an ethylene-methyl acrylate-glycidyl methacrylate copolymer layer 22, a denatured polyolefin layer 26, an ethylene-vinyl alcohol copolymer layer 27, a denatured polyolefin layer 28, and a plasticized Nylon 11 layer 29 in sequence from inside to outside. The layers 21, 22, 26, 27, 28 and 29 are respectively 0.2 mm, 0.05 mm, 0.05 mm, 0.1 mm, 0.1 mm, and 0.5 mm in thickness.

Embodiment 6

The tube of Embodiment 6 is composed similarly to Embodiment 5. Here the layers 22, 26 are replaced with an epoxy adhesive layer. Treatment to enhance the wettability and adhesion of the epoxy adhesive is applied to the outer surface of ethylene-ethylene tetrafluoride copolymer ETFE layer 21.

Embodiment 7

The tube of Embodiment 7 includes six layers and is 8 mm in outside diameter and 6 mm in inside diameter. The tube is formed by laminating, in sequence from inside to outside, a polyvinylidene fluoride PVDF layer, an ethylene-glycidyl methacrylate copolymer layer, a denatured polyolefin layer, an ethylene vinyl alcohol copolymer layer, a denatured polyolefin layer, and a high density polyethylene layer. The thicknesses thereof are respectively 0.1 mm, 0.05 mm, 0.05 mm, 0.1 mm, 0.1 mm, and 0.6 mm.

Comparing the results in Table 2 and the criterion (3) shown above, the tubes of Embodiments 1 to 7 of the present invention were found to be highly effective in impermeability and flexibility.

Any known methods such as coextrusion forming and extrusion coating may be arbitrarily employed as a method of forming the fuel transfer tubes of Embodiments 1, 2, 4, 5, and 7 of the present invention. In particular, a coextrusion forming method using five extruders and a tube die for multiple layers may produce endless tubes efficiently.

Alternatively, the fuel transfer tube of Embodiments 3 and 6 of the present invention may be produced by forming an FTFE tube, treating the surface of the tube by corona discharge, applying an epoxy adhesive on the treated surface, and secondly by covering thus formed tube with outside layers extruded from a tube die for three kinds and three layers.

All the tubes in the foregoing embodiments are composed of five or six layers, however, as far as the tubes have a layer of hot-melt fluororesin inside and another layer of partial aromatic polyamide resin or ethylene-vinyl alcohol copolymer outside, other layer or layers are not limited.

The principle resins mentioned above are defined below. The tubes of the present invention were tested by the same methods as mentioned above in relation to the prior art and the results are given in Table 2.

Definition of principal resins (Partial aromatic polyamide resins)

The partial aromatic polyamide resins used in the present invention are polyamide containing a diamine component and a dicarboxylic acid component. One or two of the said two components may include a portion (or a component) having an aromatic ring in the molecular chain and the portion may be just a part of each of the said components or the portion may comprise the whole of one of the said components.

Furthermore, the other portion or portions (or other component or components) having no aromatic ring in the molecular chain may include an aliphatic or alicyclic component, and the polyamide is obtainable by condensation polymerization of the above.

The components for forming the said partial aromatic polyamide resins include, for example, as an aromatic dicarboxylic acid, terephthalic acid, isophthalic acid, phthalic acid, 2-methyl terephthalic acid, 2,5-dimethyl terephthalic acid, naphthalene dicarboxylic acid and the like. On the other hand, as an aromatic diamine, methaxylene diamine (MXDA), paraxylene diamine, and so forth are included.

As an aliphatic dicarboxylic acid, for example, malonic acid, succinic acid, glutaric acid, adipic acid, sebacic acid, undecanic acid, dodecanic acid and the like may be used. And as an aliphatic diamine, for example, ethylene diamine, trimethylene diamine, tetramethylene diamine, pentamethylene diamine, hexamethylene diamine (HMDA), dodecamethylene diamine, 2,2,4-/2,4,4-trimethyl hexamethylene diamine (TMD), 5-methyl nona methylene diamine, 2,4-dimethyl octa methylene diamine and others may be employed.

An alicyclic diamine includes, for example, 4,4'-diamino dicyclohexylene methane, 4,4'-diamino-3,3'-dimethyl dicyclohexylene methane (CA), and others.

Practical examples of the partial aromatic polyamide resins include, for example, polyamide MXD6 composed of MXDA and adipic acid, polyamide 6T composed of HMDA and terephthalic acid, polyamide 6I composed of HMDA and isophthalic acid, polyamide 6T/6I composed of HMDA and terephthalic acid/isophthalic acid, polyamide composed of TMD and terephthalic acid, polyamide composed of HMDA/CA and terephthalic acid/isophthalic acid, polyamide 66/6T/6I composed of HMDA and adipic acid/terephthalic acid/isophthalic acid, and polyamide composed of CA, terephthalic acid/isophthalic acid and further lauryl lactam.

The partial aromatic polyamide resins of the present invention may be used either alone or by blending them with a small amount of aliphatic polyamide or the like. Furthermore a variety of stabilizers and additives may be added and blended therein.

Commercial examples of such partial aromatic polyamide resins available in the market include MX Nylon of Mitsubishi Gas Chemical Co., ARLEN of Mitsui Petrochemical Co., Nydur of Bayer AG, Ultramid T of BASF AG, Novamid X21 of Mitsubishi Chemical Co., Selar PA of Du Pont, Grivory and Grilamid TR of EMS, Amodel of Amoco, and Trogamid of Hüls.

(Ethylene-vinyl alcohol copolymers)

The ethylene-vinyl alcohol copolymers used in the present invention are obtained by saponification of ethylene-vinyl acetate copolymer, and the compound with the ethylene content of 60 mol % or less and the degree of saponification of 90% or more is usually preferably employed.

The copolymers, or the resins, may be blended with ordinary additives, such as antioxidant and forming aid. Furthermore, in order to improve the processability of EVOH, a small amount of ethylene-vinyl alcohol copolymer with the vinyl alcohole content of less than 40 mol % may be blended therein.

(Hot-melt fluororesins)

Fluororesins are intrinsically excellent in resistance to corrosion and chemicals, and also highly effective in non-absorption of water, wear resistance, non-tackiness, self-lubricity, heat and cold resistance, and weather resistance.

Among fluororesins, polyethylene tetrafluoride has a melt index of $10^9$ to $10^{12}$ poise at 380° C. It is a thermoplastic resin, but poor in thermoplasticity, and cannot be melted and formed in ordinary procedures.

Fluororesins used in the present invention are therefore thermoplastic as well as capable of extrusion molding, such as polyvinylidene fluoride resin (PVDF), ethylene-ethylene tetrafluoride copolymer resin (ETFE), polyvinyl fluoride resin (PVF), ethylene-chloride trifluoroethylene copolymer resin (E-CTFE), polychloride trifluoride ethylene resin (PCTFE), ethylene tetrafluoride-propylene hexafluoride copolymer resin (FEP), ethylene tetrafluoride-perfluoroalkoxy ethylene copolymer resin (PFA), and ethylene tetrafluoride-propylene hexafluoride-perfluoroalkoxy ethylene copolymer resin (EPA), and others.

PVDF and ETFE are particularly preferable among them from the viewpoint of forming-processability and adhesion to other resins.

(Polyvinylidene fluoride resins)

The polyvinylidene fluoride resins (PVDF) used in the present invention are homopolymer of vinylidene fluoride, or copolymer of vinylidene fluoride and copolymerizable monomer. Examples of copolymerizable monomers include, for example, vinyl fluoride, ethylene tetrafluoride, ethylene chloride trifluoride, propylene hexafluoride, and others.
(Ethylene-ethylene tetrafluoride copolymer resins) The ethylene-ethylene tetrafluoride copolymer resins used in the invention are copolymer of which molar ratio of ethylene/ethylene tetrafluoride is in a range of 30/70 to 60/40, the copolymer being blended with, if necessary, a small amount of other copolymerizable monomer.

(Adhesion of innermost layer and middle layer)

Since fluororesins are generally non-sticky, it is difficult to adhere them to other substrates.

Various techniques in adhering fluororesins have been proposed, and the means of adhesion in the present invention is not particularly limited so long as it does not depart from the object of the invention.

As a method of adhesion, adhesive resins as the other substrate to which fluororesins are adhered are proposed. For example, specific ethylene-ester acrylate copolymer, ethylene-vinyl acetate copolymer, their denatured compounds, polyolefin containing epoxy group, and resin composition of copolymer grafting vinylidene fluoride and methyl methacrylate polymer are known.

Methods to enhance adhesion by reforming the surface of a fluororesin are known. These methods include, for example, the method wherein alkaline metal is treated by being immersed in a liquid in which ammonia or naphthalene is dispersed, and the method of processing by corona discharge, plasma discharge or sputter etching. Conditions in the methods are suitably determined respectively by the known art.

(Layer outside of middle layer)

As long as an innermost layer is of hot-melt fluororesin, another layer outside of the innermost layer is of partial aromatic polyamide resin or ethylene-vinyl alcohol copolymer, an adhesive layer or an adhesive treatment is provided between the two layers, and the above layers are formed into a tube, other outer layer or layers are not limitative and no layer may be provided there.

However, if the wall thickness of a fuel transfer tube is extremely small with respect to the outside diameter thereof, when the tube is bent, it may be buckled or folded to interrupt the flow of liquid. Or a proper wall thickness is necessary when a joint, which is generally needed to connect the tube with other tool, is attached to it. Moreover outermost layers are usually required to have characteristics of weather resistance, flaw resistance, wear resistance, flexibility, flame retardation, coloring property, printability, antistatic property, electric insulation, and pressure resistance. It is therefore preferably to laminate another layer or layers of other substance having required characteristics as outermost layers.

For example, where antistatic property is required, a resin with volume intrinsic resistance of about $10^2$ to $10^9$ Ω . cm may be used, while where strength against pressure is required, a braided layer of fibers may be provided.

[Test results]

As known from the description herein, the present invention provides a fuel transfer tube suitable for use in transferring alcohol, gasoline, or a mixture thereof, and excellent in resistance to fuel oil and sour gasoline, impermeability of gasoline, and non-eluting property.

What is claimed is:

1. A flexible fuel transfer tube impermeable to alcohol, gasoline, and gasoline-alcohol mixtures, and having non-eluting properties, comprising:

at least a first layer and a second layer;

TABLE 2

| | Embodiments | | | | | | | | | |
|---|---|---|---|---|---|---|---|---|---|---|
| | Layer Composition (Inside → Outside) | | | | | Permeability φ 8 × φ 6 (g/m/day) | | | | Flexi- |
| Embodiments | Inner Layer | Adhesive Layer | Middle Layer | Adhesive Layer | Outer Layer | Regular Gasoline | Fuel C | Methanol | FAM15 | bility (kgf) |
| 1 | Polyvinylidene fluoride (PVDF) | Ethylene-vinyl acetate-glycidyl methacrylate copolymer | Partial aromatic polyamide (MXD6) | Denatured polyolefin | Plasticized nylon 11 | 0.0001 | 0.0001 | 0.14 | 0.13 | 0.8 |
| | (Thickness) 0.2 mm | 0.05 | 0.01 | 0.05 | 0.6 | | | | | |
| 2 | Ethylene-ethylene tetrafuoride copolymer (ETFE) | Ethylene-methyl acrylate-glycidyl methacrylate copolymer | Partial aromatic polyamide (MXD6) | Acid denatured polystyrene-ethylene butadiene copolymer | Polyester elastomer | 0.0001 | 0.0001 | 0.04 | 0.04 | 0.8 |
| | (Thickness) 0.3 mm | 0.05 | 0.1 | 0.05 | 0.5 | | | | | |
| 3 | Ethylene-ethylene tetrafuoride copolymer (ETFE) | ① Treatment of corona discharge ② Epoxy adhesive | Partial aromatic polyamide (MXD6) | Acid denatured polystyrene-ethylene butadiene copolymer | Polyester elastomer | 0.0001 | 0.0001 | 0.04 | 0.04 | 0.9 |
| | (Thickness) 0.3 mm | 0.05 | 0.1 | 0.05 | 0.5 | | | | | |
| 4 | Polyvinylidene fluoride (PVDF) | Acid denataured ethylene-ethyl acrylate copolymer | Ethylene-vinyl alcohol copolymer | Denatured polyolefin | Plasticized nylon 11 | 0.0008 | 0.0007 | 0.15 | 0.13 | 0.8 |
| | (Thickness) 0.2 mm | 0.05 | 0.1 | 0.05 | 0.6 | | | | | |
| 5 | Ethylene-ethylene tetrafuoride copolymer (ETFE) | ① Ethylene-methyl acrylate-glycidyl methacrylate copolymer ② Denatured polyolefin | Ethylene-vinyl alcohol copolymer | Denatured polyolefin | Plasticized nylon 11 | 0.001 | 0.001 | 0.05 | 0.04 | 0.7 |
| | (Thickness) 0.2 mm | 0.05–0.05 | 0.1 | 0.1 | 0.5 | | | | | |
| 6 | Ethylene-ethylene tetrafuoride copolymer (ETFE) | ① Treatment of corona discharge ② Epoxy adhesive | Ethylene-vinyl alcohol copolymer | Denatured polyolefin | Plasticized nylon 11 | 0.001 | 0.001 | 0.04 | 0.05 | 0.7 |
| | (Thickness) 0.3 mm | 0.05 | 0.1 | 0.05 | 0.5 | | | | | |
| 7 | Polyvinylidene fluoride (PVDF) | ① Ethylene-glycidyl methacrylate copolymer ② Denatured polyolefin | Ethylene-Vinyl Alcohol Copolymer | Denatured polyolefin | High density polyethylene | 0.0008 | 0.0007 | 0.18 | 0.16 | 0.9 |
| | (Thickness) 0.1 mm | 0.05–0.05 | 0.1 | 0.1 | 0.6 | | | | | |

[Note] Forming Methods
Embodiments 1, 2 and 4
Plasticize each resin by five extruders, and coextrude the resins by a tube die for five layers/five kinds.
Embodiments 3 and 6
Form an ETFE tube, treat the surface thereof with corona discharge, coat it with epoxy adhesive, and cover the tube with outside layers extruded from a tube die for three layers/three kinds.
Embodiments 5 and 7
Plasticize each resin by six extruders, and coextrude the resins by a tube die for six layers/six kinds.

said first layer being an innermost layer of a hot-melt fluororesin, wherein said hot-melt fluororesin is thermoplastic and capable of being extrusion molded;

said second layer being outside said first layer; and said second layer being a partial aromatic polyamide resin.

2. The fuel transfer tube of claim 1, wherein said hot-melt fluororesin is selected from the group consisting of a polyvinylidene fluoride resin and an ethylene-ethylene tetrafluoride copolymer resin.

3. The fuel transfer tube of claim 1, wherein said hot-melt fluororesin is selected from the group consisting of a polyvinylidene fluoride resin, an ethylene-ethylene tetrafluoride copolymer resin, polyvinyl fluoride resin, ethylene-chloride trifluoroethylene copolymer resin, polychloride trifluoride ethylene resin, ethylene tetrafluoride-perfluoroalkoxy ethylene copolymer resin, and ethylene tetrafluoride-propylene hexafluoride-perfluoroalkoxy ethylene copolymer resin.

4. The fuel transfer tube of claim 1, wherein: said partial aromatic polyamide resin is a polyamide containing a diamine component and a dicarboxylic acid component, with an aromatic ring in at least part of a molecular chain of at least one of said diamine component and said dicarboxylic acid component, and at least one of an aliphatic component or an alicyclic component in another of said diamine component and said dicarboxylic acid component; and said polyamide is obtained by condensation polymerization of said diamine and dicarboxylic acid components.

5. The fuel transfer tube of claim 1, further comprising an adhesive layer disposed between said first layer and said second layer; and said adhesive layer is an adhesive resin substrate for adhering said first layer of hot-melt fluororesin to said second layer.

6. The fuel transfer tube of claim 1, wherein a surface of said first layer is subjected to an adhesion enhancing surface treatment to form an adhesion enhanced surface, an adhesive layer is provided between said adhesion enhanced surface and said second layers and said adhesive layer is an adhesive resin substrate for adhering said first layer to said second layer.

7. A flexible fuel transfer tube impermeable to alcohol, gasoline, and gasoline-alcohol mixtures, and having non-eluting properties, comprising:

at least a first layer and a second layer;

said first layer being an innermost layer of a hot-melt fluororesin, wherein said hot-melt fluororesin is thermoplastic and capable of being extrusion molded;

said hot-melt fluororesin being selected from the group consisting of an ethylene-ethylene tetrafluoride copolymer resin, ethylene-chloride trifluoroethylene copolymer resin, polychloride trifluoride ethylene resin, ethylene tetrafluoride-perfluoroalkoxy ethylene copolymer resin, and ethylene tetrafluoride-propylene hexafluoride-perfluoroalkoxy ethylene copolymer resin;

said second layer being outside said first layer; and said second layer being an ethylene-vinyl alcohol copolymer.

8. The fuel transfer tube of claim 2, wherein said polyvinylidene fluoride resin is one of a homopolymer of polyvinylidene fluoride and a copolymer of polyvinylidene fluoride with a copolymerizable monomer.

9. The fuel transfer tube of claim 8, wherein said copolymerizable monomer includes at least one selected from the group consisting of vinyl fluoride, ethylene tetrafluoride, ethylene chloride trifluoride, and propylene hexafluoride.

10. The fuel transfer tube of claim 2, wherein said ethylene-ethylene tetrafluoride copolymer resin has a molar ratio for ethylene/ethylene tetrafluoride in a range of 30/70 to 60/40.

11. The fuel transfer tube of claim 3, wherein said polyvinylidene fluoride resin is one of a homopolymer of polyvinylidene fluoride and a copolymer of polyvinylidene fluoride with a copolymerizable monomer.

12. The fuel transfer tube of claim 11, wherein said copolymerizable monomer includes at least one selected from the group consisting of vinyl fluoride, ethylene tetrafluoride, ethylene chloride trifluoride, and propylene hexafluoride.

13. The fuel transfer tube of claim 3, wherein said ethylene-ethylene tetrafluoride copolymer resin has a molar ratio for ethylene/ethylene tetrafluoride in a range of 30/70 to 60/40.

14. The fuel transfer tube of claim 5, wherein said adhesive resin is at least one selected from the group consisting of ethylene ester acrylate copolymer, ethylene-vinyl acetate copolymer, polyolefin containing an epoxy group, and resin compositions of copolymer grafting vinylidene fluoride and methyl methacrylate polymer.

15. The fuel transfer tube of claim 6, wherein said adhesive resin is at least one selected from the group consisting of ethylene ester acrylate copolymer, ethylene-vinyl acetate copolymer, polyolefin containing an epoxy group, and resin compositions of copolymer grafting vinylidene fluoride and methyl methacrylate polymer.

16. The fuel transfer tube of claim 6, wherein said adhesion enhancing surface treatment is one of immersing in a dispersion of ammonia, immersing in a dispersion of naphthalene, plasma discharge, corona discharge, and sputter etching.

17. The fuel transfer tube of claim 7, wherein said ethylene-ethylene tetrafluoride copolymer resin has a molar ratio for ethylene/ethylene tetrafluoride in a range of 30/70 to 60/40.

18. A flexible fuel transfer tube impermeable to alcohol, gasoline, and gasoline-alcohol mixtures, and having non-eluting properties, comprising:

at least a first layer and a second layer;

said first layer being an innermost layer of a hot-melt fluororesin, wherein said hot-melt fluororesin is thermoplastic and capable of being extrusion molded;

said second layer being outside said first layer; and said second layer being an ethylene-vinyl alcohol copolymer;

an adhesive layer disposed between said first layer and said second layer; and said adhesive layer is an adhesive resin substrate for adhering said first layer of hot-melt fluororesin to said second layer;

said adhesive resin being at least one selected from the group consisting of ethylene ester acrylate copolymer, polyolefin containing an epoxy group, and resin compositions of copolymer grafting vinylidene fluoride and methyl methacrylate polymer.

19. A flexible fuel transfer tube impermeable to alcohol, gasoline, and gasoline-alcohol mixtures, and having non-eluting properties, comprising:

at least a first layer and a second layer;

said first layer being a hot-melt fluororesin, wherein said hot-melt fluororesin is thermoplastic and capable of being extrusion molded; and said second layer being a partial aromatic polyamide resin.

20. The fuel transfer tube of claim 19, wherein said hot-melt fluororesin includes at least one selected from the group consisting of a polyvinylidene fluoride resin and an ethylene-ethylene tetrafluoride copolymer resin.

21. The fuel transfer tube of claim 19, wherein said hot-melt fluororesin includes at least one selected from the group consisting of a polyvinylidene fluoride resin, an ethylene-ethylene tetrafluoride copolymer resin, polyvinyl fluoride resin, ethylene-chloride trifluoroethylene copolymer resin, polychloride trifluoride ethylene resin, ethylene tetrafluoride-perfluoroalkoxy ethylene copolymer resin, and ethylene tetrafluoride-propylene hexafluoride-perfluoroalkoxy ethylene copolymer resin.

22. The fuel transfer tube of claim 20, wherein said polyvinylidene fluoride resin is one of a homopolymer of polyvinylidene fluoride and a copolymer of polyvinylidene fluoride with a copolymerizable monomer.

23. The fuel transfer tube of claim 22, wherein said copolymerizable monomer includes at least one selected from the group consisting of vinyl fluoride, ethylene tetrafluoride, ethylene chloride trifluoride, and propylene hexafluoride.

24. The fuel transfer tube of claim 20, wherein said ethylene-ethylene tetrafluoride copolymer resin has a molar ratio for ethylene/ethylene tetrafluoride in a range of 30/70 to 60/40.

25. The fuel transfer tube of claim 21, wherein said polyvinylidene fluoride resin is one of a homopolymer of polyvinylidene fluoride and a copolymer of polyvinylidene fluoride with a copolymerizable monomer.

26. The fuel transfer tube of claim 25, wherein said copolymerizable monomer includes at least one selected from the group consisting of vinyl fluoride, ethylene tetrafluoride, ethylene chloride trifluoride, and propylene hexafluoride.

27. The fuel transfer tube of claim 21, wherein said ethylene-ethylene tetrafluoride copolymer resin has a molar ratio for ethylene/ethylene tetrafluoride in a range of 30/70 to 60/40.

28. The fuel transfer tube of claim 19, wherein:

said partial aromatic polyamide is a polyamide containing a diamine component and a dicarboxylic acid component, with an aromatic ring in at least part of a molecular chain of at least one of said diamine component and said dicarboxylic acid component, and at least one of an aliphatic component or an alicyclic component in another of said diamine component and said dicarboxylic acid component;

said polyamide is obtained by condensation polymerization of said diamine and dicarboxylic acid components.

29. The fuel transfer tube of claim 19, further comprising an adhesive layer disposed between said first layer and said second layer; and said adhesive layer is an adhesive resin substrate for adhering said first layer of hot-melt fluororesin to said second layer.

30. The fuel transfer tube of claim 19, wherein:

a surface of said first layer is subjected to an adhesion enhancing surface treatment to form an adhesion enhanced surface;

an adhesive layer is provided between said adhesion enhanced surface and said second layer; and said adhesive layer is an adhesive resin substrate for adhering said first layer to said second layer.

31. The fuel transfer tube of claim 29, wherein said adhesive resin is at least one selected from the group consisting of ethylene ester acrylate copolymer, ethylene-vinyl acetate copolymer, polyolefin containing an epoxy group, and resin compositions of copolymer grafting vinylidene fluoride and methyl methacrylate polymer.

32. The fuel transfer tube of claim 30, wherein said adhesive resin is at least one selected from the group consisting of ethylene ester acrylate copolymer, ethylene-vinyl acetate copolymer, polyolefin containing an epoxy group, and resin compositions of copolymer grafting vinylidene fluoride and methyl methacrylate polymer.

33. The fuel transfer tube of claim 30, wherein said adhesion enhancing surface treatment is one of immersing in a dispersion of ammonia, immersing in a dispersion of naphthalene, plasma discharge, corona discharge, and sputter etching.

34. A flexible fuel transfer tube impermeable to alcohol, gasoline, and gasoline-alcohol mixtures, and having non-eluting properties, consisting essentially of:

a first layer and a second layer;

said first layer being an innermost layer of a hot-melt fluororesin, wherein said hot-melt fluororesin is thermoplastic and capable of being extrusion molded;

said second layer being disposed outside said first layer; and said second layer being a partial aromatic polyamide resin.

35. The fuel transfer tube of claim 34, wherein said hot-melt fluororesin is selected from the group consisting of a polyvinylidene fluoride resin and an ethylene-ethylene tetrafluoride copolymer resin.

36. The fuel transfer tube of claim 34, wherein said hot-melt fluororesin is selected from the group consisting of a polyvinylidene fluoride resin, an ethylene-ethylene tetrafluoride copolymer resin, polyvinyl fluoride resin, ethylene-chloride trifluoroethylene copolymer resin, polychloride trifluoride ethylene resin, ethylene tetrafluoride-perfluoroalkoxy ethylene copolymer resin, and ethylene tetrafluoride-propylene hexafluoride-perfluoroalkoxy ethylene copolymer resin.

37. The fuel transfer tube of claim 35, wherein said polyvinylidene fluoride resin is one of a homopolymer of polyvinylidene fluoride and a copolymer of polyvinylidene fluoride with a copolymerizable monomer.

38. The fuel transfer tube of claim 37, wherein said copolymerizable monomer is selected from the group consisting of vinyl fluoride, ethylene tetrafluoride, ethylene chloride trifluoride, and propylene hexafluoride.

39. The fuel transfer tube of claim 35, wherein said ethylene-ethylene tetrafluoride copolymer resin has a molar ratio for ethylene/ethylene tetrafluoride in a range of 30/70 to 60/40.

40. The fuel transfer tube of claim 36, wherein said polyvinylidene fluoride resin is one of a homopolymer of polyvinylidene fluoride and a copolymer of polyvinylidene fluoride with a copolymerizable monomer.

41. The fuel transfer tube of claim 40, wherein said copolymerizable monomer is selected from the group consisting of vinyl fluoride, ethylene tetrafluoride, ethylene chloride trifluoride, and propylene hexafluoride.

42. The fuel transfer tube of claim 36, wherein said ethylene-ethylene tetrafluoride copolymer resin has a molar ratio for ethylene/ethylene tetrafluoride in a range of 30/70 to 60/40.

43. The fuel transfer tube of claim 34, wherein:

said partial aromatic polyamide resin is a polyamide containing a diamine component and a dicarboxylic acid component, with an aromatic ring in at least part of a molecular chain of at least one of said diamine component and said dicarboxylic acid component, and at least one of an aliphatic component or an alicyclic component in another of said diamine component and said dicarboxylic acid component;

said polyamide is obtained by condensation polymerization of said diamine and dicarboxylic acid components.

44. A flexible fuel transfer tube impermeable to alcohol, gasoline, and gasoline-alcohol mixtures, and having non-eluting properties, comprising:

at least a first layer and a second layer;

said first layer being a hot-melt fluororesin, wherein said hot-melt fluororesin is thermoplastic and capable of being extrusion molded; and said second layer being an ethylene-vinyl alcohol copolymer;

said hot-melt fluororesin includes at least one selected from the group consisting of an ethylene-ethylene tetrafluoride copolymer resin, ethylene-chloride trifluoroethylene copolymer resin, polychloride trifluoride ethylene resin, ethylene tetrafluoride-perfluoroalkoxy ethylene copolymer resin, and ethylene tetrafluoride-propylene hexafluoride-perfluoroalkoxy ethylene copolymer resin.

45. The fuel transfer tube of claim 44, wherein said ethylene-ethylene tetrafluoride copolymer resin has a molar ratio for ethylene/ethylene tetrafluoride in a range of 30/70 to 60/40.

46. A flexible fuel transfer tube impermeable to alcohol, gasoline, and gasoline-alcohol mixtures, and having non-eluting properties, comprising:

at least a first layer and a second layer;

said first layer being a hot-melt fluororesin, wherein said hot-melt fluororesin is thermoplastic and capable of being extrusion molded;

said second layer being an ethylene-vinyl alcohol copolymer;

said ethylene-vinyl alcohol copolymer being obtained by a saponification of ethylene-vinyl acetate copolymer and a degree of said saponification is at least 90%; and said ethylene-vinyl alcohol copolymer contains no more than 60 mole % ethylene.

47. A flexible fuel transfer tube impermeable to alcohol, gasoline, and gasoline-alcohol mixtures, and having non-eluting properties, comprising:

at least a first layer, a second layer, and an adhesive layer disposed between said first layer and said second layer;

said first layer being a hot-melt fluororesin, wherein said hot-melt fluororesin is thermoplastic and capable of being extrusion molded;

said second layer being an ethylene-vinyl alcohol copolymer; and said adhesive layer being an adhesive resin substrate for adhering said first layer of hot-melt fluororesin to said second layer and being at least one selected from the group consisting of ethylene ester acrylate copolymer, polyolefin containing an epoxy group, and resin compositions of copolymer grafting vinylidene fluoride and methyl methacrylate polymer.

48. The fuel transfer tube of claim 47, wherein:

a surface of said first layer is subjected to an adhesion enhancing surface treatment to form an adhesion enhanced surface;

said adhesive layer is provided between said adhesion enhanced surface and said second layer; and said adhesive layer is an adhesive resin substrate for adhering said first layer to said second layer.

49. The fuel transfer tube of claim 48, wherein said adhesion enhancing surface treatment is one of immersing in a dispersion of ammonia, immersion in a dispersion of naphthalene, plasma discharge, corona discharge and sputter etching.

50. A flexible fuel transfer tube impermeable to alcohol, gasoline, and gasoline-alcohol mixtures, and having non-eluting properties, consisting essentially of:

a first layer and a second layer;

said first layer being an innermost layer of a hot-melt fluororesin, wherein said hot-melt fluororesin is thermoplastic and capable of being extrusion molded;

said hot-melt fluororesin being selected from the group consisting of an ethylene-ethylene tetrafluoride copolymer resin, ethylene-chloride trifluoroethylene copolymer resin, polychloride trifluoride ethylene resin, ethylene tetrafluoride-perfluoroalkoxy ethylene copolymer resin, and ethylene tetrafluoride-propylene hexafluoride-perfluoroalkoxy ethylene copolymer resin;

said second layer being disposed outside said first layer; and said second layer being an ethylene-vinyl alcohol copolymer disposed outside said first layer.

51. The fuel transfer tube of claim 50, wherein said ethylene-ethylene tetrafluoride copolymer resin has a molar ratio for ethylene/ethylene tetrafluoride in a range of 30/70 to 60/40.

52. The fuel transfer tube of claim 51, wherein said ethylene-vinyl alcohol copolymer is obtained by a saponification of ethylene-vinyl acetate copolymer and a degree of said saponification is at least 90%; and said ethylene-vinyl alcohol copolymer contains no more than 60 mole % ethylene.

53. The fuel transfer tube of claim 18, wherein a surface of said first layer is subjected to an adhesion enhancing surface treatment to form an adhesion enhancing surface.

54. The fuel transfer tube of claim 53, wherein said adhesion enhancing surface treatment is one of immersing in a dispersion of ammonia, immersing in a dispersion of naphthalene, plasma discharge, corona discharge, and sputter etching.

* * * * *

UNITED STATES PATENT AND TRADEMARK OFFICE
CERTIFICATE OF CORRECTION

PATENT NO. : 5,763,034
DATED : June 9, 1998
INVENTOR(S) : Todomu NISHINO et al.

It is certified that error appears in the above-identified patent and that said Letters Patent is hereby corrected as shown below:

Column 10, line 61, through Column 12, line 16, Claims 19 through 33, inclusive, should be cancelled.

Column 13, line 12, after "second layer" and before the semicolon, insert --, said first layer being an innermost layer and said second layer being outside said first layer--.

Column 13, line 33, after "second layer" and before the semicolon, insert --, said first layer being an innermost layer and said second layer being outside said first layer--.

Column 13, line 48, after "second layer" and before the semicolon, insert --, said first layer being an innermost layer and said second layer being outside said first layer--.

Signed and Sealed this

Eighteenth Day of July, 2000

*Attest:*

Q. TODD DICKINSON

*Attesting Officer*          *Director of Patents and Trademarks*